United States Patent [19]

Maddock

[11] 3,730,492

[45] May 1, 1973

[54] MIXING OF THERMOPLASTIC MATERIALS

[75] Inventor: Bruce H. Maddock, Fanwood, N.J.

[73] Assignee: Union Carbide Corporation, New York, N.Y.

[22] Filed: June 17, 1971

[21] Appl. No.: 154,011

[52] U.S. Cl. ............................................. 259/193
[51] Int. Cl. ................................................ B29f 3/00
[58] Field of Search .................. 259/191, 192, 97, 259/193, 9, 10, 25, 26, 45, 46; 425/202, 209, 472

[56] References Cited

UNITED STATES PATENTS

| | | | |
|---|---|---|---|
| 3,319,299 | 5/1967 | Kiraly | 259/191 |
| 3,486,192 | 12/1969 | LeRoy | 425/202 X |

Primary Examiner—Robert W. Jenkins
Assistant Examiner—Philip R. Coe
Attorney—Paul A. Rose et al.

[57] ABSTRACT

Apparatus is disclosed for heating thermoplastic material to a flowable condition, longitudinally advancing the heated material under pressure toward the discharge end of the apparatus with a rotating extrusion screw having a mixer head at the downstream end thereof; dividing said heated material into a plurality of streams and passing said streams through a plurality of longitudinal mixing passages; passing the plurality of individual streams of the partially fluxed melt through high shear zones between said mixer head and the barrel of said extrusion apparatus; and passing the fluxed melt into the interior of the mixer head and therethrough to the discharge end of said mixer head.

4 Claims, 3 Drawing Figures

PATENTED MAY 1 1973 3,730,492

INVENTOR
BRUCE H. MADDOCK
BY
ATTORNEY

MIXING OF THERMOPLASTIC MATERIALS

The present invention relates to the fluxing of thermoplastic materials and, more particularly, to apparatus for the fluxing and mixing of synthetic organic thermoplastic resins.

A wide variety of apparatus have been proposed for the fluxing and mixing of thermoplastic materials. The essential requirements for such apparatus include rapid fluxing or melting of the material and efficient mixing of the material components into a homogeneous blend, both at an effectively high throughput rate. Whereas some prior apparatus is capable of satisfying the desired fluxing and mixing requirements, they are incapable of delivering the necessary throughput rate. Other prior apparatus sacrifices fluxing and/or mixing efficiency in order to provide the required throughput rate.

Accordingly, it is the prime object of the present invention to provide apparatus for the mixing of thermoplastic materials having high fluxing and mixing efficiency and capable of delivering a high material throughput rate.

Other objects and advantages will be apparent from the following description and appended claims.

In accordance with the present invention, apparatus is provided for fluxing and mixing thermoplastic material involving the steps of: (a) heating thermoplastic material to a flowable condition in extrusion apparatus; (b) longitudinally advancing the heated material under pressure toward the discharge end of the apparatus with a rotating extrusion screw having a mixer head at the downstream end thereof, thereby forming a partially fluxed and mixed melt; (c) dividing said partially fluxed and mixed melt into a plurality of streams; (d) and passing said plurality of streams through swirling mixing zones in a plurality of substantially longitudinal passages; (e) passing said plurality of streams of said partially fluxed and mixed melt through high shear zones between said mixer head and the barrel of said extrusion apparatus to obtain a fully fluxed melt; and (f) passing said plurality of streams through an internal longitudinal passage of said mixer head for further mixing and discharge from said extrusion apparatus to obtain a fully fluxed and mixed melt.

More specifically, initial fluxing or melting of the thermoplastic mix is first effected in a conventional screw section of the extruder. Initial mixing of the components of the thermoplastic mix is also carried out in this stage. The partially fluxed and mixed material is then passed as a plurality of streams into longitudinal mixing passages of the mixer head and through high shear zones which effect complete fluxing of the material. After complete fluxing, the streams of material are joined and finally mixed in an internal mixing zone to effect complete mixing of the thermoplastic material.

In accordance with the invention, apparatus is provided for the mixing of thermoplastic materials having a hollow barrel; screw means mounted in said barrel to advance material through said barrel; mixer head means longitudinally mounted in said barrel on the terminal end of said screw means to shearingly engage material between said mixer head means and said barrel; a plurality of groove means arranged to extend substantially longitudinally in the surface of said mixer head means, said groove means open at the upstream ends and closed at the downstream ends; hollow internal passage means positioned axially within said mixer head means over a substantial portion of its terminal length; and a plurality of radial inlet conduits communicating between said internal passage means and the exterior of said mixer head means.

It is preferred that the inlet conduits are positioned between a pair of lands which are, in turn, positioned between the groove means. Each pair of lands comprises a full diameter cleaning land, having close clearance with the interior walls of the hollow barrel of the extruder, and a reduced diameter shearing land which provides a region of high shear between the land and the interior walls of the hollow barrel of the extruder. The shearing lands are located on the leading sides of the inlet conduits and the cleaning lands are located on the trailing sides of the inlet conduits (as defined by the direction of rotation of the mixer head means).

Figure 1:
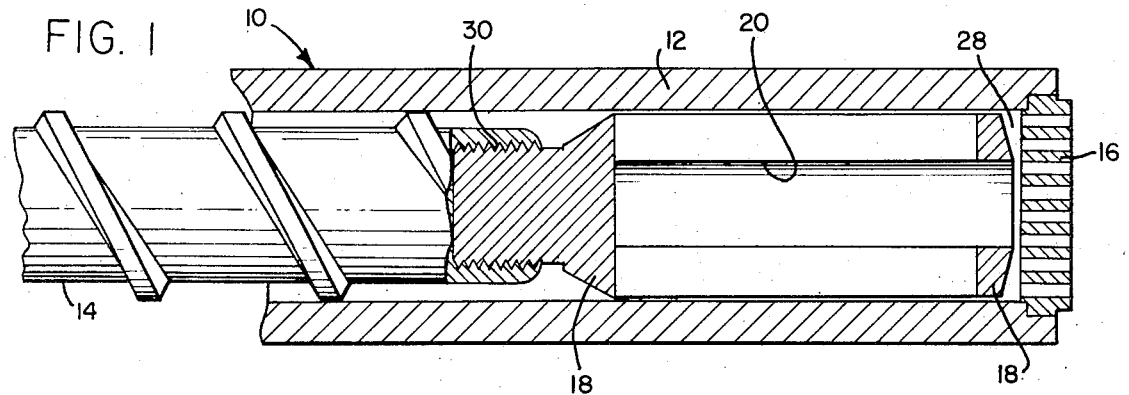
FIG. 1 is a cross-sectional view of extruder apparatus embodying the invention.
Figure 2:
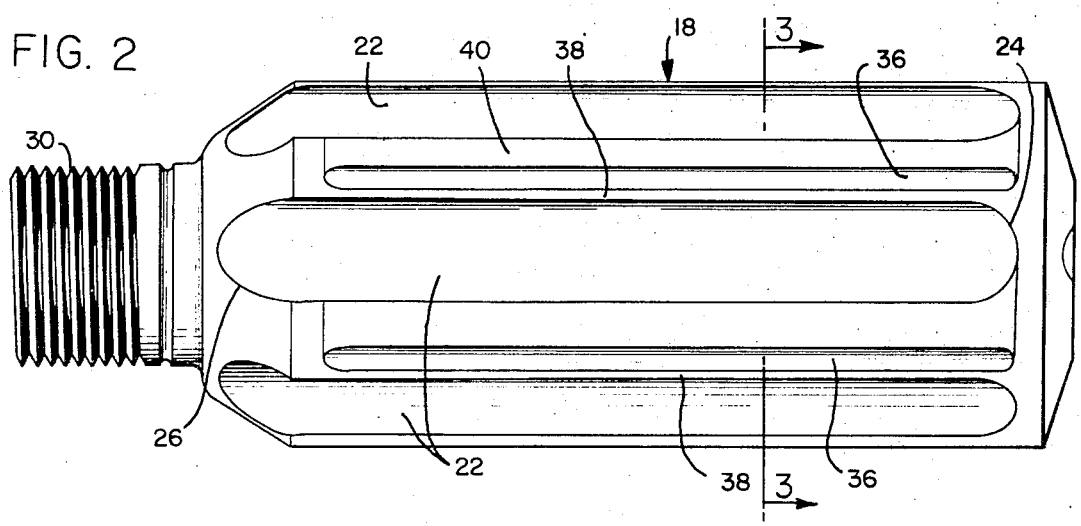
FIG. 2 is an elevational view of mixer head means employed in the embodiment of FIG. 1.

Referring specifically to the embodiment of the drawing, extruder 10 is provided having outer housing 12, screw means 14 and breaker plate 16. Cylindrical mixer head means 18 is positioned on the terminal (downstream) end of screw means 14 and comprises an internal axial passage 20 and a plurality of external longitudinal groove means 22 open on the upstream ends 26 and closed on the downstream ends 24.

Mixer head means 18 is secured to screw means 14 as by screw threads 30.

As thermoplastic material is fed to extruder 10, it is partially fluxed in the upstream portion of the extruder by screw means 14. The partially fluxed material is divided into a plurality of streams and passed through the plurality of mixing grooves 22 and through the high shear zones between the shearing lands and the interior of the barrel. The mix streams are then passed to the plurality grooves 22 where they are mixed by a circular, swirling action in the grooves caused by the feed and rotational movement of the mixer head means within the extruder barrel. It has been noted that this circular, swirling action of the thermoplastic material streams provides a self-mixing or self-cleaning action which acts to prevent the buildup or clogging of material in the grooves of the mixer head means. After passage through the high shear zones the streams pass internally through a plurality of radial inlet conduits or slots 36 positioned longitudinally between the pair of lands 38 and 40 between the grooves 22 on the exterior surface of the cylinder means to and through the internal axial mixing passage 20.

Figure 3:
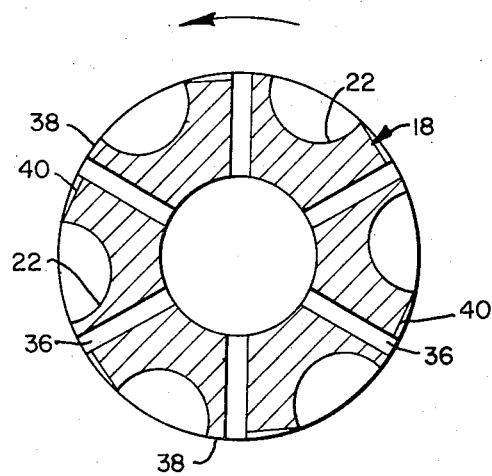
FIG. 3 is a sectional view taken along the line 3—3 of FIG. 2.

As shown in FIG. 3, it is preferred that the shearing lands 38 are of reduced diameter and that the cleaning lands are of full diameter. Such configuration of slots and lands provides a high shear zone between the shearing lands 38 and the internal barrel wall of the extruder which fully fluxes the thermoplastic material mix.

As the fully fluxed and mixed thermoplastic material streams are joined in and passed along and out the inner axial mixing passage 20 the material discharges to chamber 28 upstream of breaker plate 16.

In an example of operation in accordance with the present invention polyethylene was fed to an extruder of the type shown in the embodiment of the drawing. The data obtained in such example is as set forth in the following table. It was noted, from examination of the resultant extrudate, that the thermoplastic material mix had been fully fluxed and mixed to a homogeneous mass.

TABLE

| | | | |
|---|---|---|---|
| Diameter, in | 2.50 | | |
| Barrier Length, in. | 5.125 | | |
| Mixing Barrier Land Width, in. | 0.185 | | |
| Cleaning Barrier Land Width, in. | 0.185 | | |
| Clearance Over Mixing Barrier, in | 0.020 | | |
| Clearance Over Cleaning Barrier, in. | 0.002 | | |
| Channel Radius, in. | 0.406 | | |
| Material | Polyethylene, 2.0 MI | | |
| Barrel Temperature, °F. | 300 | | |
| Material Feed Temperature, °F | 350 | | |
| Throughput Rate, lbs/hr | 67 | | |
| Speed, rpm | 40 | 60 | 100 |
| Pressure Drop, psi | 75 | 20 | −60 |
| Temperature Rise, °F. | −28 | −16 | +9 |

What is claimed is:

1. In an extruder having a hollow barrel, screw means mounted in said barrel to advance material through said barrel, and mixer head means longitudinally mounted in said barrel near the terminal end of said screw means in close clearance to shearingly engage material between said mixer head means and said barrel, the improvement which comprises:

a. a plurality of groove means arranged to extend substantially longitudinally in the surface of said mixer head means, said groove means open at the upstream ends and closed at the downstream ends;

b. hollow internal passage means positioned axially within said mixer head means over a substantial portion of its terminal length; and c. a plurality of radial inlet conduits communicating between said internal passage means and the exterior of said mixer head means, said inlet conduits being positioned between a pair of lands which are positioned, in turn, between said groove means.

2. Apparatus in accordance with claim 1, wherein each pair of lands comprises a cleaning land of full diameter and a shearing land of reduced diameter to form a shearing zone in cooperation with said barrel, said clearing land and said shearing land being positioned, respectively, on the trailing and leading sides of said inlet conduits with respect to the direction of rotation of said mixer head means.

3. Apparatus in accordance with claim 1, wherein said inlet conduits comprise longitudinal slots running substantially the entire length of said groove means.

4. Apparatus in accordance with claim 3, wherein each pair of lands comprises a cleaning land of full diameter and a shearing land of reduced diameter to form a shearing zone in cooperation with said barrel, said cleaning land and said shearing land being positioned, respectively, on the trailing and leading sides of said inlet conduits with respect to the direction of rotation of said mixer head means.

* * * * *